(12) United States Patent
Madhusudan

(10) Patent No.: US 11,424,605 B2
(45) Date of Patent: Aug. 23, 2022

(54) AIRCRAFT LIGHTNING AVOIDANCE SYSTEMS AND METHODS

(71) Applicant: Bell Textron, Inc., Fort Worth, TX (US)

(72) Inventor: Phalgun Madhusudan, Urbana, IL (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 16/858,542

(22) Filed: Apr. 24, 2020

(65) Prior Publication Data

US 2021/0336431 A1    Oct. 28, 2021

(51) Int. Cl.
| | | |
|---|---|---|
| *B65D 45/02* | (2006.01) | |
| *H02G 13/00* | (2006.01) | |
| *B64D 45/02* | (2006.01) | |
| *H01T 23/00* | (2006.01) | |
| *H01T 1/08* | (2006.01) | |

(52) U.S. Cl.
CPC ............. *H02G 13/60* (2013.01); *B64D 45/02* (2013.01); *H01T 23/00* (2013.01); *H01T 1/08* (2013.01)

(58) Field of Classification Search
CPC ........ H02G 13/00; H02G 13/60; H01T 23/00; B64D 45/02; G01R 29/0842; G01R 29/08; G03G 15/0291; G03G 15/027; B03C 3/41; B64C 29/0033; B64C 2201/021
USPC ......................................................... 361/218
See application file for complete search history.

(56) References Cited

U.S. PATENT DOCUMENTS

| | | | | |
|---|---|---|---|---|
| 3,191,094 | A   * | 6/1965  | Schuyler ................... | H05F 3/00 361/218 |
| 2017/0313438 | A1 * | 11/2017 | Martinez-Sanchez ...................... | G01R 29/0842 |
| 2018/0346145 | A1 * | 12/2018 | Prakash ................... | H02H 9/06 |
| 2021/0261246 | A1 * | 8/2021  | Tsubata ................... | B64C 13/16 |

OTHER PUBLICATIONS

Karman vortex street; https://en.wikipedia.org/wiki/K%C3%A1rm%C3%A1n_vortex_street#/media/File:Karmansche_Wirbelstr_kleine_Re.JPG; May 23, 2015.
Breakdown Voltage vs. Pressure, Paschen's Law and The Paschen Curve; https://www.duniway.com/images/_pg/paschen-curve.pdf; Apr. 12, 2020.
Jun. 15 SC IL close lightning/severe storms; http://stormhighway.com/blog2010/june1510a.php; Jun. 15, 2010.
Rayleigh-Taylor instability; https://en.wikipedia.org/wiki/Rayleigh%E2%80%93Taylor_instability; Apr. 16, 2020.
Rayleigh-Benard convection; https://en.wikipedia.org/wiki/Rayleigh%E2%80%93B%C3%A9nard_convection; Apr. 18, 2020.

* cited by examiner

*Primary Examiner* — Danny Nguyen
(74) *Attorney, Agent, or Firm* — Pramudji Law Group PLLC; Ari Pramudji

(57) ABSTRACT

According to one implementation of the present disclosure, a method is disclosed. The method includes: detecting, on or proximate to one or more surfaces of an aircraft, a presence of an electric-field above a predetermined threshold; and in response to the detection, activating one or more beam sources to generate an ionized column of charge away from the aircraft.

13 Claims, 6 Drawing Sheets

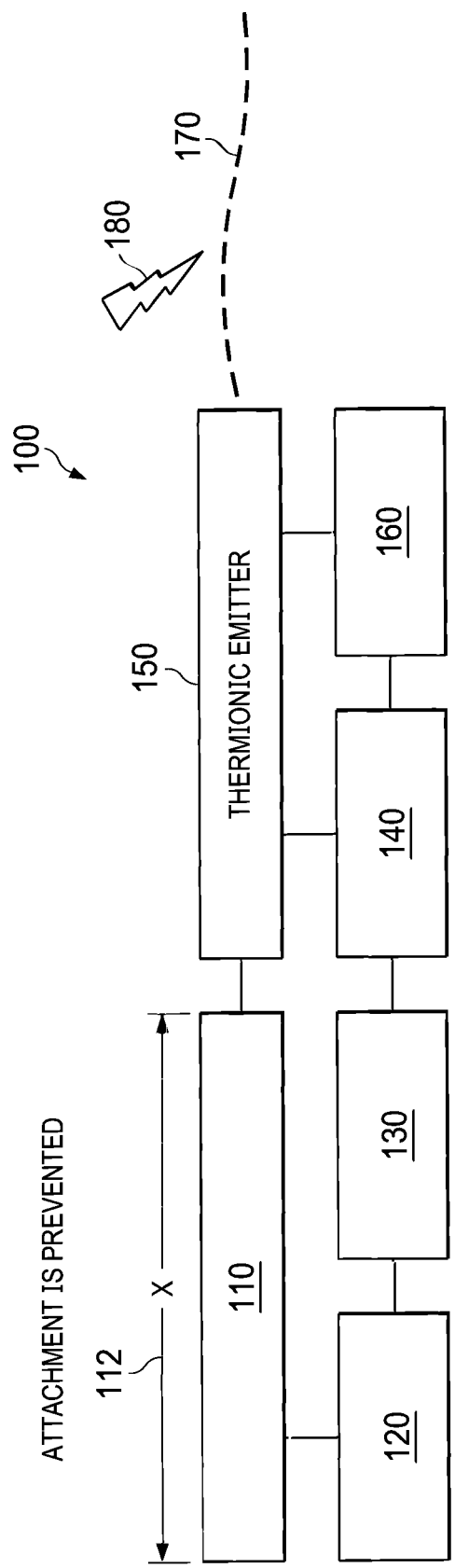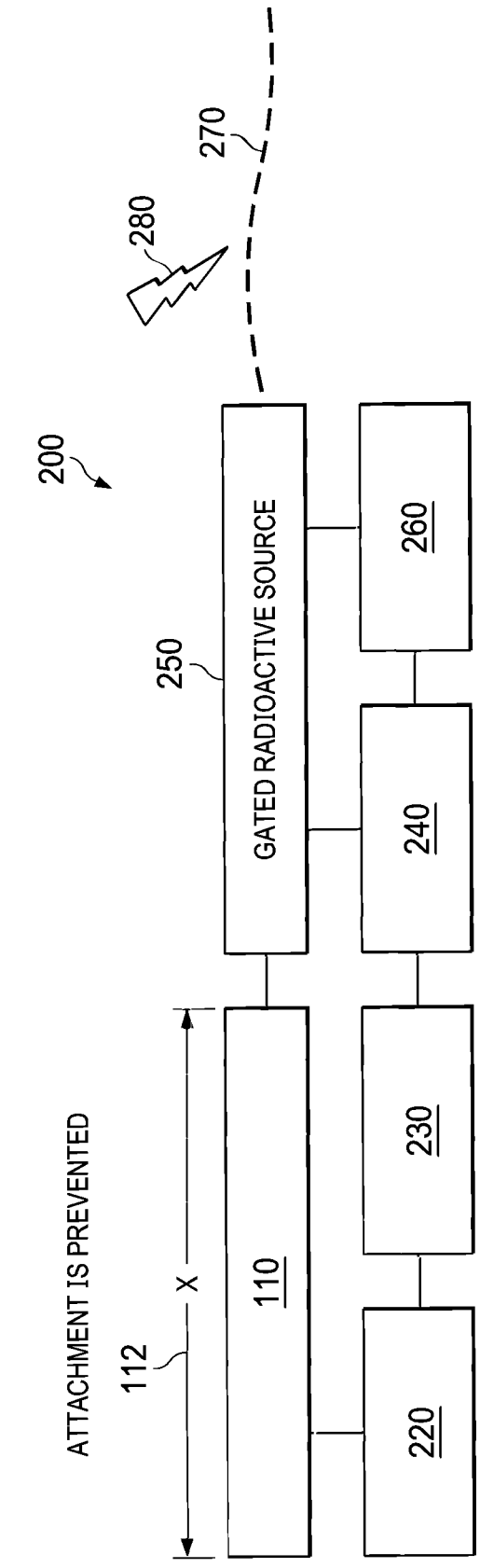

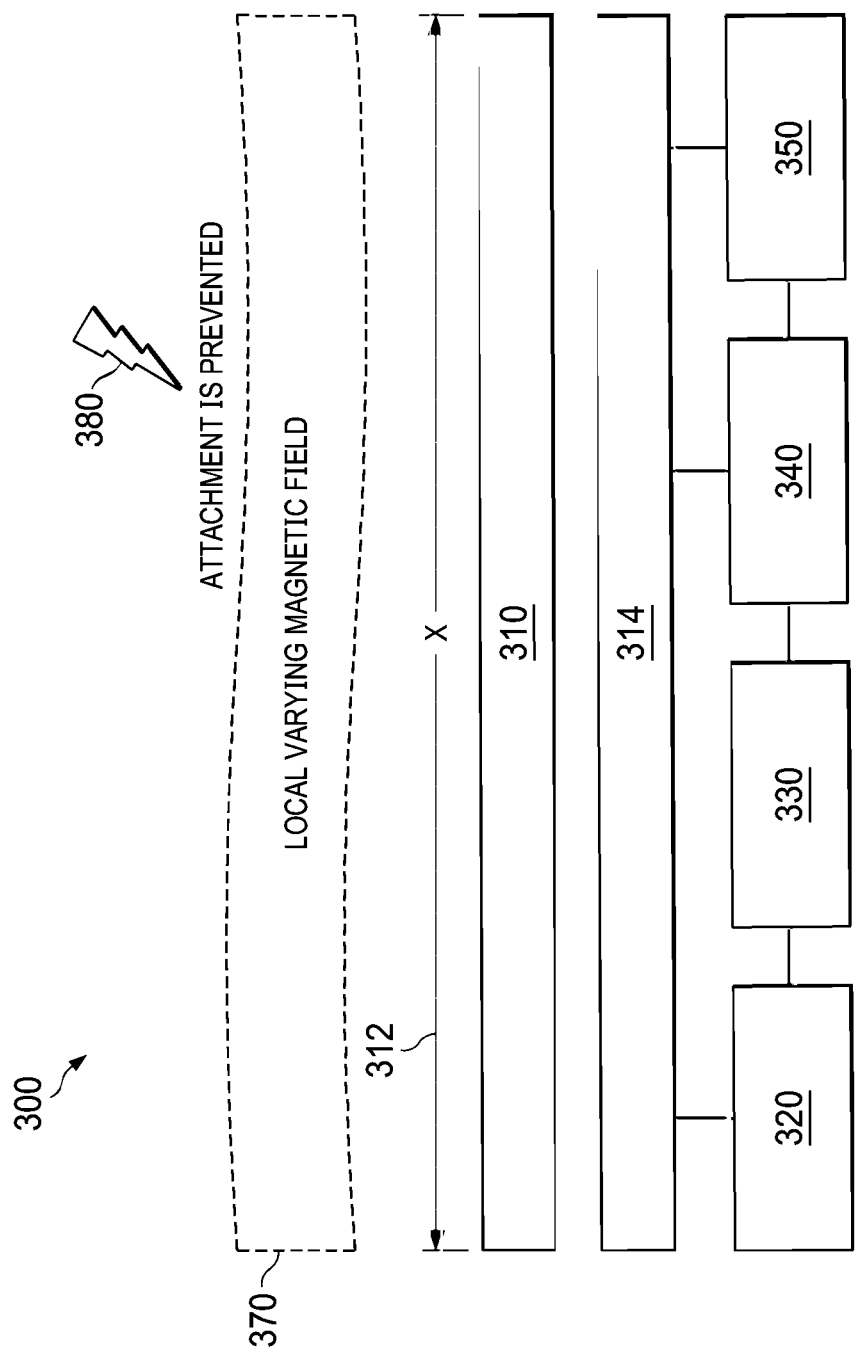

AIRCRAFT LIGHTNING AVOIDANCE SYSTEMS AND METHODS

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Aircrafts are often vulnerable to lightning strikes because they are made of conductive materials. Flying an aircraft into a storm often provides a conductive path for lightning discharges (i.e., leader attachment) to occur and hence, the likelihood of lightning strike increases. Accordingly, avoidance of leader attachment is an ongoing need in the art.

SUMMARY

According to one implementation of the present disclosure, a method is disclosed. The method includes: detecting, on or proximate to one or more surfaces of an aircraft, a presence of an electric-field above a predetermined threshold; and in response to the detection, activating one or more beam sources to generate an ionized column of charge away from the aircraft.

According to another implementation of the present disclosure, a system is disclosed. The system includes: one or more sensors coupled to one or more aircraft surfaces and configured to detect whether a presence of an electric field, on or proximate to one or more aircraft surfaces, is above a predetermined threshold; and one or more control systems coupled to the one or more sensors, where the one or more control systems are configured to receive sensor data from the one or more sensors and to activate one or more beam sources to generate an ionized column of charge away from an aircraft.

According to one implementation of the present disclosure, a method is disclosed. The method includes: detecting, on or proximate to one or more aircraft surfaces, a presence of an electric-field above a predetermined threshold; and in response to the detection, providing a current to the one or more aircraft surfaces.

The above-referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

FIG. 1 illustrates a diagram in accordance with implementations of various techniques described herein.

FIG. 2 illustrates a diagram in accordance with implementations of various techniques described herein.

FIG. 3 illustrates a diagram in accordance with implementations of various techniques described herein.

Figure 4:
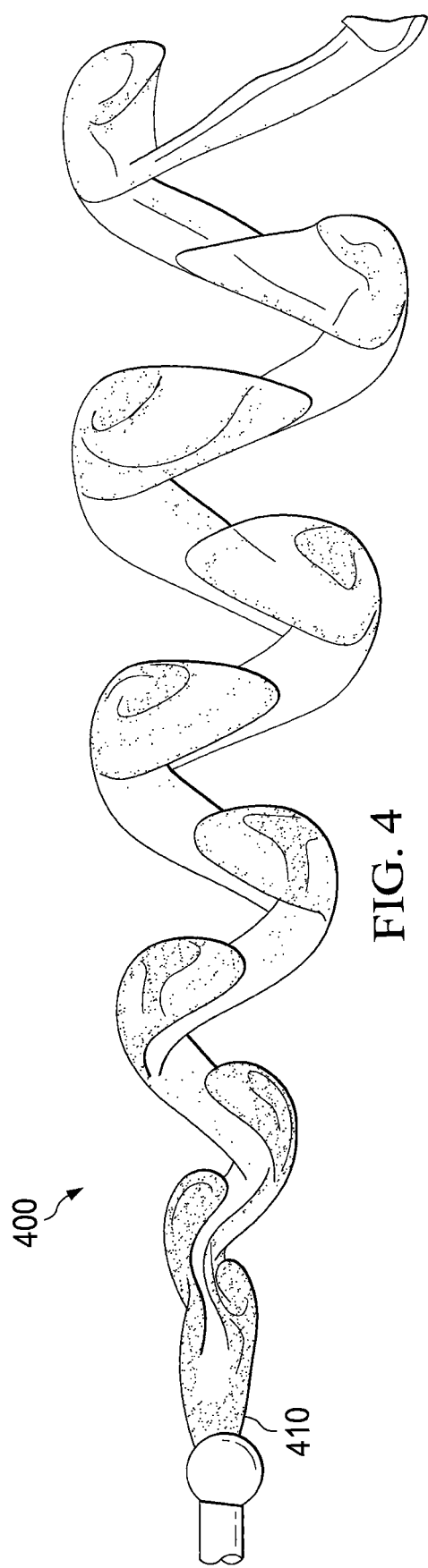
FIG. 4 illustrates a diagram in accordance with implementations of various techniques described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

While flying near storms, aircrafts may often be vulnerable to lightning strikes. Lightning strikes occur when in a lightning environment, surfaces of an aircraft become sufficiently charged such that both metallic and dielectric parts of the aircraft are temporarily polarized. Systems and methods of the present disclosure proactively avoid, or at the very least, temporarily avoid the completion of a full lightning discharge path on or near the aircraft. Accordingly, aircrafts may safely navigate airspace in the proximity of storms.

According to research and modeling associated with the inventive aspects described herein, it is observed that conditions for lightning strikes ripen when the formation of tiny channels of ionized air (i.e., ionized plasma channels) are stabilized with electric and magnetic fields (that may be generated by the movement of the ionized plasma channels through atmospheric air). This stabilization is known as the formation of "stable streamers". Next, as stable streamers come in contact (i.e., connect) with "lightning leaders" (i.e., ionized plasma columns/channels generated when metallic and dielectric surfaces of an aircraft surface are sufficiently charged), "leader attachment" would result. The connection between the stable streamers and lightning leaders is henceforth referenced as leader attachment. Once leader attachment may be achieved, a full lightning discharge path may be completed, and conditions would now be present for imminent lightning strike occurrences and re-occurrences.

In certain implementations, the systems and methods provide lightning leaders a more attractive path for attachment safely away from aircrafts (e.g., airplanes, rotorcrafts, commercial drones, unmanned aerial vehicles, etc.). Advantageously, in such implementations, the inventive aspects provide for the "firing" of concentrated "bursts" of ion beams (i.e., charged particle beams) in an environment conducive to lightning strikes a safe distance away from an aircraft. By doing so, lightning attachment would preferentially occur through the ion beam and not the aircraft. Hence, the ion beams may emulate an ionized plasma channel similar to that of a stable streamer. Accordingly, various implementations described herein allow for the avoidance of lightning strikes.

In some implementations, the systems and methods may prevent leader attachment from forming near or on an aircraft for a time period sufficient for the aircraft to travel a safe distance away from lighting leaders. In such implementations, the inventive aspects provide for the detection of an increase in electric field on aircraft surfaces, and in response, provide transmission of currents to such aircraft surfaces so as to disrupt surface magnetic fields.

Referring to FIGS. 1 and 2, example aerial systems 100, 200 (e.g., aircraft systems) implementing lightning avoidance systems using charged particle beams (e.g., ion or electron beams) are shown. In certain examples, as illustrated in both FIGS. 1 and 2, each of the aircraft systems 100, 200 may include one or more aircraft surfaces 110, 210 one or more sensors 120, 220 (e.g., electroscope sensors), a first control system 130, 230 (i.e., a first control logic system), a second control system 140, 240 (i.e., a second control logic system), one or more beam sources 150, 250 (e.g., thermionic emitters 150 or gated radioactive sources 250) and a power source 160. In one implementation, as shown in FIG. 1, the aircraft system 100 includes one or more thermionic emitters 150 (as the beam source) to transmit a trailing discontinuous charged particle beam 170 (e.g., an ion beam) to generate an ionized a column of charge away from the aircraft. In another implementation, as shown in FIG. 2, the aircraft system 200 includes one or more gated radioactive sources 250 (as the beam source) (having a door for pulsation) to transmit a trailing discontinuous charged particle beam 270 (e.g., an electron beam) to also generate an ionized a column of charge away from the aircraft. Advantageously, in both implementations, the ionized column of charge would attract a potential leader attachment 180, 280 of a lightning strike episode at a safe distance away from the aircraft. Moreover, the first and second control systems 130, 140; 230, 240 may be electrically coupled (e.g., physically or wirelessly coupled) to the respective one or more sensors 120, 220 (e.g., electroscope sensors) and the respective one or more beam sources 150, 250.

In FIGS. 1 and 2, the one or more aircraft surfaces 110, 220 are shown to be in a lightning zone 112, 212. A lightning zone 112, 212 includes regions (the length of "X") of the aircraft surfaces 110, 220 that have the highest likelihood of leader attachment 180, 280) (e.g., significantly above a predetermined leader attachment 180, 280 threshold). In various implementations, the lightning zones 112, 212 may be predetermined based on prior operational lightning data analysis and/or real-time data received while in operation.

In certain implementations, the one or more aircraft surfaces 110, 210 may include different metal materials including, but not limited to, aluminum, titanium, and their respective alloys. Moreover, such aircraft surfaces 110, 210 may be found on any exterior metal portion (i.e., metal surface) of the aircraft including, but not limited to the fuselage (i.e., body), wings, fins, etc. In certain cases, where the aircraft may be a rotorcraft, the aircraft surfaces may include any exterior metal portion (i.e., metal surface) including, but not limited to the main rotor, the tail boom, tail rotor, etc.

The one or more sensors 120, 220 of the aerial systems 100, 200 may include any type of sensor that can detect the presence of electric charge on the various aircraft surfaces 110, 210 (i.e., surfaces) including, but not limited to, electroscope sensors. In such instances, the electroscope sensors may provide an approximate indication of the quantity of charge on such surfaces 110, 210. In some cases, the sensors 120, 220 may be coupled to but separate from the aircraft surfaces 110, 220 and in other cases, the sensors 120, 220 may be attached to an under-side (e.g., underneath, behind) of the aircraft surfaces 110, 210.

In various cases, charging of the aircraft surfaces 110, 210 may be non-uniform. For instance, surfaces 110, 210 that include sharp edges, such as the nose, tail, discharge wicks, and rotors may be charged much faster and to much higher potentials in comparison to other surfaces. Measurements of charge may be accomplished by placing the sensors 120, 220 (e.g., electroscopes) underneath the surfaces 110, 210. In certain instances, many sources of static fields may be present inside the aircraft, and hence, appropriate care should be taken to tune the sensors 120, 220 to a threshold that would be crossed on the account of lightning and not because of, for example, triboelectric charging or internal fields. It is further noted that the process of streamer formation would involve development of vast amounts of charges on the aircraft surfaces 110, 210. Also, the charging of the metallic and dielectric parts of the of the aircraft surfaces 110, 210 would be temporary and would last for a duration of external excitation.

In various implementations, the first control system (i.e., first control logic) 130, 230 may be configured to receive sensor data (i.e., charging sensor data) from the sensors 120, 220 and in turn, activate operation of lighting avoidance systems (as described herein). In some implementations, the second control system (i.e., second control logic) 140, 240 may be configured to control the ion beam source 150, 250, upon receiving activation control signals from the first control system 130, 140. Accordingly, at the appropriate time, the first control system 130, 230 may activate a second control system (i.e., second control logic) 140, 240 to provide for the transmission of charged particle beams 170, 270. In certain instances, the first control system 130, 230 may perform signal processing tasks while the second control system 140, 240 may perform control signal generation. In one alternative implementation (not shown), the two control systems 130, 140; 230 240 may be replaced by respective signal conditioning system and a control logic system. In another alternative implementation, the first and second control systems 130, 230 and 140, 240 may be integrated into one control system both receiving data from the sensors 120, 220 and control activation of the ion beam source 150, 250 for transmission of charged particle beams 170, 270.

The first and second control systems (i.e., first and second control logics) 130, 140; 230, 240 of the aerial system 100 may be either fully separated from, separate but coupled to, or incorporated within a primary electronic control system. In certain implementations, one or both of the first and second control systems 130, 230 and 140,240 may be a part of a flight control computer of an aircraft (e.g., a fly-by-wire control system of a rotorcraft). Such a flight control computer (not shown) may include a control laws module that generates actuator position commands to move actuators based on sensor data from various flight control sensors. Specifically, the first and second control systems 130, 140 would include control logic to implement the procedure 700 (as described with reference to FIG. 7) and as part of an active lightning strike avoidance program 924 (as described with reference to FIG. 9).

As shown in FIG. 1, in one example, the one or more thermionic emitters 150 (i.e., beam source 150) may generate either ion or electron beams (e.g., charged particle beams 170). In certain implementations, the process of thermionic emission may include the release (i.e., discharge) of electrons from an electrode by virtue of its temperature (i.e., the release of energy supplied by heat). Hence, electron emission would be caused by a sufficiently high level of thermal energy. In certain instances, each of the one or more thermionic emitters 150 may be coupled to an accelerating tube (e.g., similar to a cathode ray tube) (not shown) or a miniature cyclotron (not shown) (coupled to a vent to release electron beams into air space).

As shown in FIG. 2, in another example, the one or more gated radioactive sources 250 (i.e., beam source 250) (with a door for pulsation) may generate ion beams (i.e., charged particle beams 270). In certain implementations, the one or more gated radioactive sources 250 may include a known quantity of radionuclide that emits ionizing radiation. In some instances, the one or more radioactive sources 250 may include one or more of alpha emitters, positron emitters, beta emitters, gamma ray sources, or neutron radiation sources. However, while neutron radiation sources may be utilized as a radioactive source 250, neutron radiation sources may be less reliable than the other options as neutron radiation emissions are uncharged and may ionize air molecules during collusion.

The one or more beam sources 150, 250 may be designed to transmit charged particle beams 170, 270 in any one direction in three-dimensional air space. For example, the one or more beam sources 150, 250 may emit ion beams 170, 270 in "pulses", where each pulse duration may be between 1 ms and 100 ms. Moreover, an example, "off" time would include the pulse duration and an addition 10 ms. Hence, in operation, the charged particle beams would be discontinuous. Also, the one or more beam sources 150, 250 may be configured to emit the charged particle beams 170, 270 at a length corresponding to a mean free path greater than a path threshold, where the path threshold corresponds to a predetermined safe distance interval. Moreover, the predetermined safe distance interval may correspond to a distance required to prevent a stable streamer formation on the aircraft. In various cases, when the mean free path of a free ion beam in air is relatively low, the range of effect (cm) may be similarly low as well (e.g., when Alpha energy is 4 MeV, the range may be 4 cm; and when Alpha energy is 10 MeV, the range may be above 10 cm). The parameters that may determine the mean free path for an ion in air include, but are not limited to: the density of air at a given altitude (e.g., lower density, higher path length); the mass of the ion; the charge on the ion; and kinetic energy. In addition, the presence of an electric field in the air (e.g., during a lightning episode) may further increase ion energy, thus, also increasing the range of the mean free path.

In certain implementations, the power source 160 may be incorporated as part of the aircraft's power bus or from an independent source. Independent sources In certain implementations, the power source may include generators, alternators, ultracapacitors or supercapacitors, regenerative systems or auxiliary power units, or batteries (e.g., lead, acid, or lithium ion battery types).

Advantageously, systems and methods as described with reference to FIGS. 1 and 2 transmit "pulses" away from an aircraft (e.g., behind) such that broken trails of charge may be created than can selectively draw lightning away from the aircraft. The charge particle beams 170, 270 would be discontinuous so as to prevent a backflow of current back to the aircraft from the lighting leader through the conducting ion column. Hence, the systems and methods provide for the capacity to reduce the likelihood of leader attachment.

Referring to FIG. 3, an example aerial system 300 (e.g., aircraft system) implementing lightning avoidance systems by utilizing current to generate a local varying magnetic field (i.e., one or more magnetic fields) is shown. In one example, as illustrated, the aerial system 300 may include one or more aircraft surfaces 310, one or more sensors 320 (e.g., electroscope sensors), a first control system 330 (i.e., control logic system), a waveform generator 340, and a power source 350. Also shown in FIG. 3 are one or more local varying magnetic fields 370 (i.e., magnetic fields) and potential leader attachment 380 of a lightning strike episode. The control system 330 may be electrically coupled (e.g., physically or wirelessly coupled) to the aircraft surfaces 310, the one or more sensors 320 (e.g., electroscope sensors), the waveform generator 340, and the power source 350.

Similar to FIGS. 1 and 2, in FIG. 3, the one or more aircraft surfaces 310 is shown to be in a lightning zone 312 (e.g., areas of the one or more aircraft surfaces 310 that may be significantly above a predetermined leader attachment 380 threshold). In various implementations, the lightning zones 312 may be predetermined based on prior operational lightning data analysis and/or real-time data received while in operation.

Furthermore, like FIGS. 1 and 2, in various implementations, the one or more aircraft surfaces 310 may include different metal materials including, but not limited to, aluminum, titanium, and their respective alloys. Moreover, such aircraft surfaces 310 may be found on any exterior metal portion (i.e., metal surface) of the aircraft including, but not limited to the fuselage (i.e., body), wings, fins, etc. In certain cases, where the aircraft may be a rotorcraft, the aircraft surfaces may include any exterior metal portion (i.e., metal surface) including, but not limited to the main rotor, the tail boom, tail rotor, etc.

In contrast to FIGS. 1 and 2, however, a respective metallic sub-surface 312 (e.g., on under regions) may also be adjoined to each of the aircraft surfaces 310. Advantageously, such respective metal sub-surfaces 312 may be designed and configured for the transmission of magnetic fields. In certain implementations, the metal sub-surfaces 312 may also be coupled to the power source 350 and the wave form generator 340 (e.g., high power electronic switching circuits that generate and drive the required currents and frequencies for magnetic field 370 transmission).

Similar to the sensors 120, 220, the one or more sensors 320 of the aerial system 300 may include any type of sensor that can detect the presence of electric charge on the various aircraft surfaces 320 (i.e., surfaces) including, but not limited to, electroscope sensors. In such instances, the electroscope sensors may provide an approximate indication of the quantity of charge on such surfaces 320. In some cases, the sensors 320 may be coupled to but separate from the aircraft surfaces 320 and in other cases, the sensors 320 may be attached to an under-side (e.g., underneath, behind) of the aircraft surfaces 320.

In various cases, similar to the aircraft surfaces 110, 210, charging of the aircraft surfaces 310 may be non-uniform. For instance, with reference to aircrafts and rotorcrafts, surfaces 310 that include sharp edges, such as the nose, tail, discharge wicks, and rotors may be charged much faster and to much higher potentials in comparison to other surfaces. Measurements of charge may be accomplished by placing the sensors 320 (e.g., electroscopes) underneath the surfaces 310. In certain instances, with reference to aircrafts, many sources of static fields may be present inside the aircraft, and hence, appropriate care should be taken to tune the sensors 320 to a threshold that would be crossed on the account of lightning and not because of, for example, triboelectric charging or internal fields. It is further noted that the process of streamer formation would involve development of vast amounts of charges on the aircraft surfaces 310. Also, the charging of the metallic and dielectric parts of the of the aircraft surfaces 310 would be temporary and would last for a duration of external excitation.

The control system (i.e., control logic) 330 may be configured to receive sensor data (i.e., charging sensor data) from the sensors 320 and in turn, activate operation of lighting avoidance systems (as described herein). At the appropriate time, the control system 330 may activate the waveform generator 340 to generate a local varying magnetic field 170 to be transmitted to the one or more aircraft surfaces 310. In doing so, high currents (300-700A) may be transmitted up through the one or more metallic sub-surfaces 314 and the one or more aircraft surfaces 310 in the lightning zone 312. Further, in various implementations, the control system 130 may activate different portions of aircraft surfaces 310 for current transmission depending on the respective lightning zone 312.

The control system (i.e., control logic) 330 of the aircraft system 300 may be either fully separated from, separate but coupled to, or incorporated within a primary electronic control system. In certain implementations, the control system 300 may be a part of a flight control computer of an aircraft (e.g., a fly-by-wire control system of a rotorcraft). Such a flight control computer (not shown) may include a control laws module that generates actuator position commands to move actuators based on sensor data from various flight control sensors. Specifically, the control system 330 would include control logic to implement the procedure 800 (as described with reference to FIG. 8) and as part of an active lightning strike prevention program 924 (as described with reference to FIG. 9).

The local varying magnetic field 370 (i.e., magnetic fields, one or more magnetic fields) may include one or more vector fields that describe the magnetic influence of electric charges in relative motion. In operation, the magnetic field 370 would repel magnetic materials of a plasma channel (generated in the clouds) to prevent leader attachment. In achieving field destabilization, at elevated frequencies (approximately between 80-150 Hz), the magnetic field 370 generated at a point of leader attachment 380 would cause the plasma channels to be "stretched" out in opposing directions. In doing so, charge trapped by the internal fields of a stable streamer can be released. Hence, plasma channel collapse would result.

In certain cases, the waveform generator 340 may be any type of signal generator used to generate the magnetic fields 370 over a wide range of signals. Furthermore, the waveform generator 340 may include or be further coupled to high power switching circuits to generate the required currents and frequencies for activation.

In certain implementations, the power source 350 may include generators, alternators, ultracapacitors or supercapacitors, regenerative systems or auxiliary power units, or batteries (e.g., lead, acid, or lithium ion battery types). The power source 350 may be provide the power necessary for the waveform generator to drive the required currents and frequencies.

Advantageously, systems and methods as described with reference to FIG. 3 provide a local varying magnetic field 370 to repel leader attachment 380. In doing so, surface currents would destabilize the electric and magnetic fields that hold the ionized plasma channels intact. For such implementations, high intensity, low frequency signals (e.g., approximately 500A) may be optimally utilized. Moreover, such systems and methods do not require any exterior surface modification, and thus no impact to aircraft aerodynamics would result.

Referring to FIG. 4, a diagram (i.e., a visualization) of the Kármán vortex street 400 is shown. The Kármán vortex street 400 is a repeating pattern of swirling vortices, caused by a process known as vortex shedding. Vortex shedding would be responsible for the unsteady separation of flow of a fluid around blunt bodies. Also, as shown in FIG. 4, the point at where vortex shedding would commence is known as the Kármán vortex point 410. As observed and verified through modeling, the Kármán vortex street 400 may correspond to charging theory in the development of lightning strikes. For example, charge (i.e., charged particles) may build up in clouds due to convection in the atmosphere. Moreover, discharge would be initiated by a local drop in electric field permittivity caused by air flow patterns.

Figure 5:
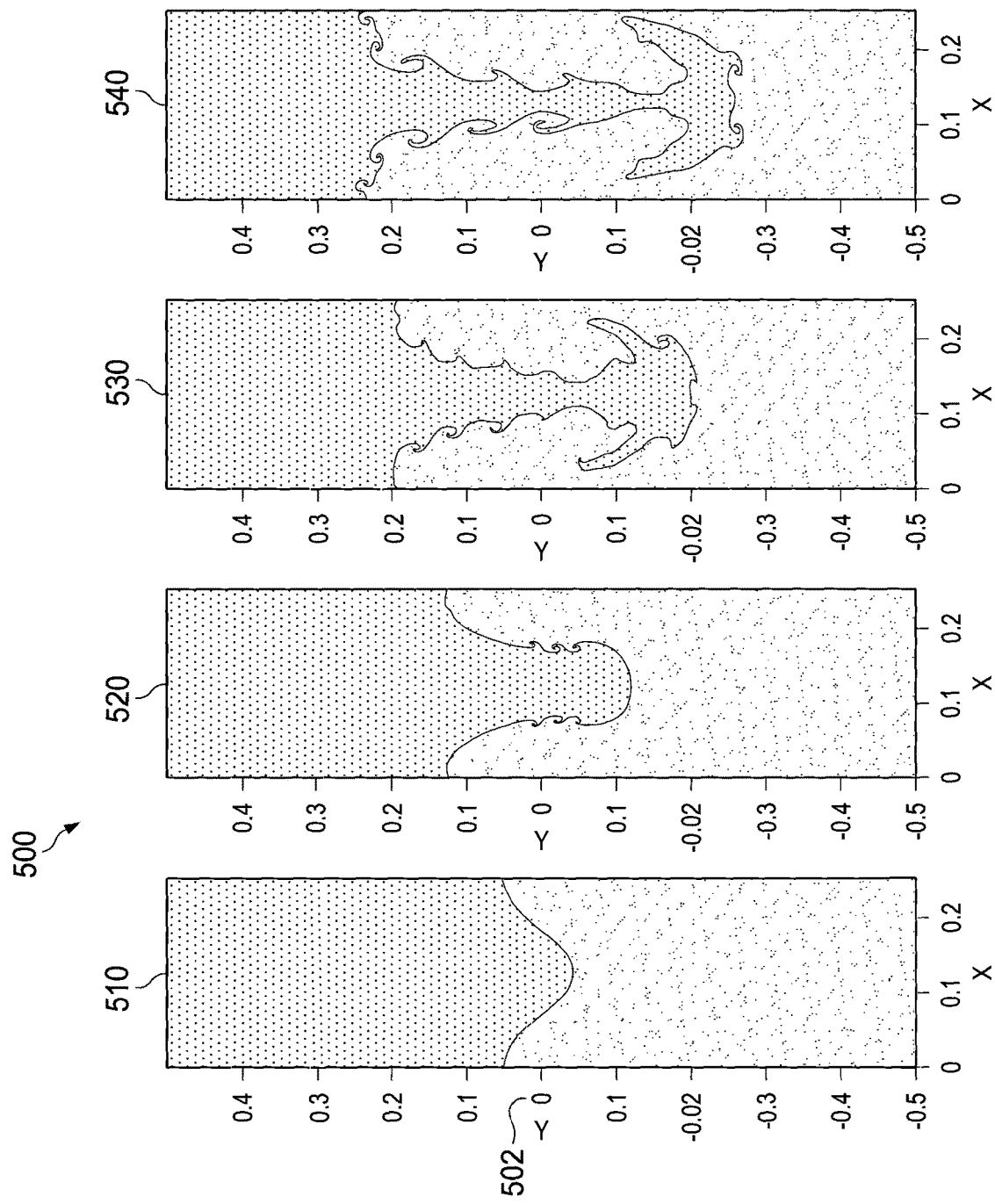
FIG. 5 illustrate graphs in accordance with implementations of various techniques described herein.

Referring to FIG. 5, a sequence of cartesian graphs 500 illustrating a hydrodynamics simulation of Rayleigh-Taylor instability (i.e., RT instability) is shown. RT instability is an instability of an interface between two fluids of different densities that may occur when a lighter fluid is pushing a heavier fluid. One example of RT instability behavior may include water suspended above oil. As shown in FIG. 5, the simulation shows cartesian graphs 510, 520, 530, and 540 each illustrating successive stages (i.e., snapshots, frames) in a sequence. In each of the cartesian graphs 510-540 (i.e., graphs), a y-component is shown from 0.4 to −0.5 and an x-component from 0 to 0.2. As depicted, the X and Y components may be arbitrary units of length, proportional to the magnitude of the disturbing field (e.g., in the case of fluids, for pressure gradients; in the case of fields, for potential or electric-fields; and in the case of lightning, a combination of the pressure drop created by the movement of layers of air against each other and against the cloud particles and the local electric field caused by the charge separation between the cloud and the ground). Correspondingly, for lightning, the X and Y components may be in units of tens of meters (m).

As observed and verified through modeling, the instability behavior may also correspond to the movement of charged particles in air. Accordingly, the charged particles in clouds would flow through regions in the air where they may seek out oppositely charged surfaces/ground. The movement of these charges may be in the form of thin filaments (i.e., streamers). In the case of lightning, the primary branch is called a leader. Of note, with references to the graphs 510-540, at the Karman Vortex point 502 (i.e., initially at y=0 in FIG. 510), the RT instability can be one underlying cause for the commencement of leader formation (i.e., the progression of streamers).

Figure 6A:
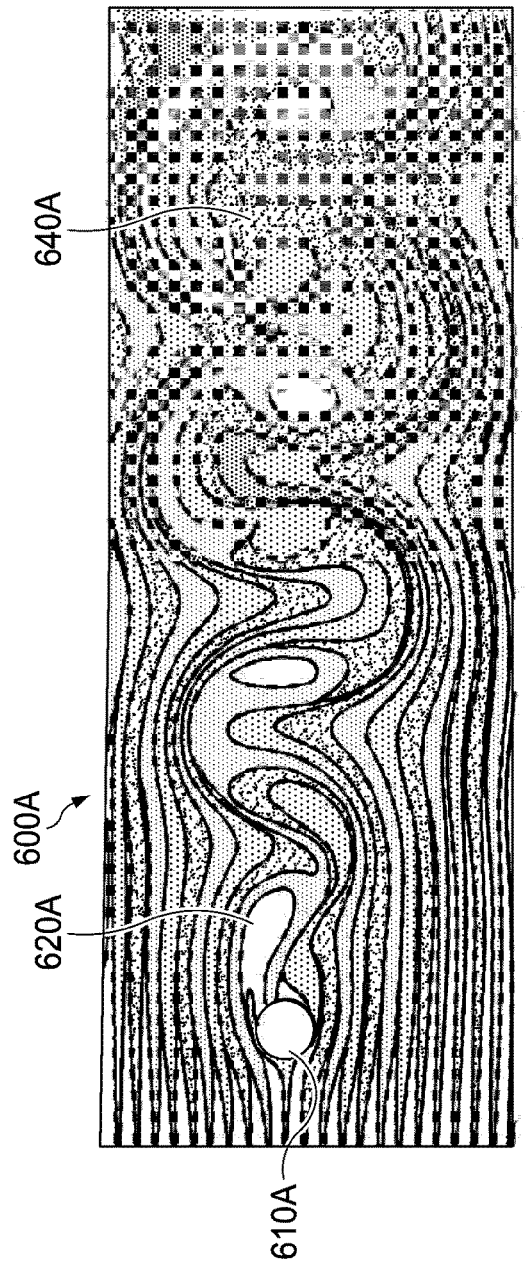
FIGS. 6A-6B illustrate diagrams in accordance with implementations of various techniques described herein.
Figure 6B:
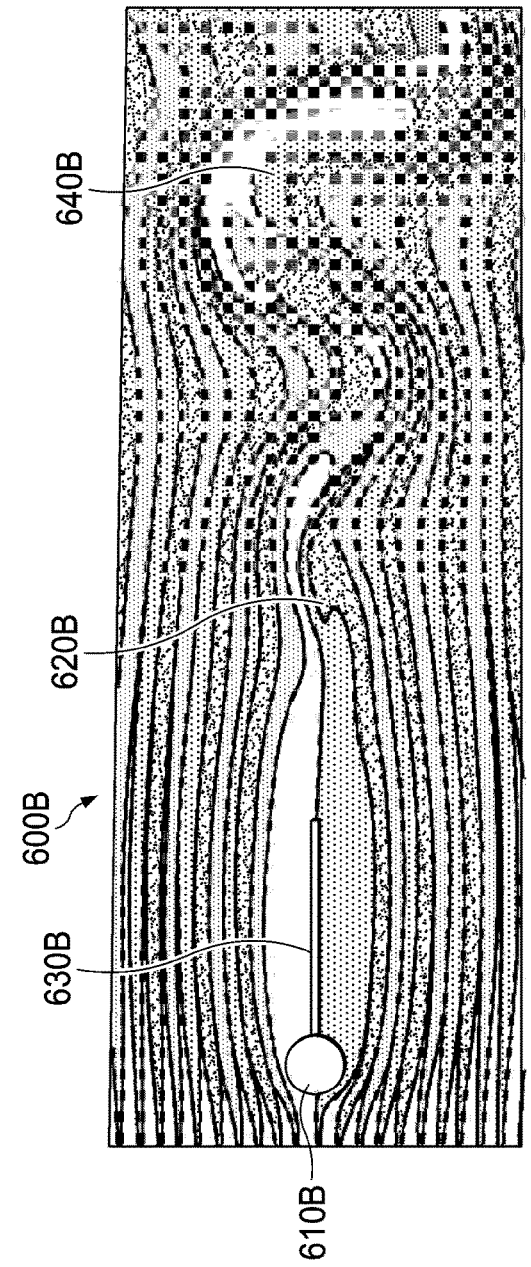

Referring to FIGS. 6A and 6B, two diagrams (600A, 600B) of plasma channels are shown. In two different representations, FIGS. 6A and 6B depict plasma channel leaders (610A, 610B) (i.e., an ionized column, tip, leader) represented along with, at 620A, 620B, and the plasma channel when stabilized. FIG. 6B further depicts the tail 630B of the leader 610B. Also depicted, is the plasma channel collapse (i.e., spreading), at 640A, 640B, in the absence of electric and magnetic fields.

In various implementations, specifically, the leader (e.g., 610A, 610B) may be formed in clouds where an electric field may be "high enough" to sustain breakdown (according to the Paschen curve where the altitude may determine the dielectric strength of the air (e.g., breakdown voltage (V) vs. pressure×gap (Torr inches)). In certain examples, water droplets may breakdown at 900 kV/m and ice crystals may breakdown at 500 kV/m. In instances of negative flash discharge, the leader may take a zig-zag path, in steps of 50 m and pauses of 20-100 µs. Further, negative flashes may discharge several charge centers in succession. Accordingly, there may be distinct pulses in current that can cause initial and subsequent return strokes.

Further attributes of leaders (e.g., 610A, 610B) include having a diameter between 1 to 10 m, were approximately 100A current may be concentrated in a highly ionized core having approximately 1 cm diameter. The average velocity of propagation may be $2 \times 10^5$ m/s. Also, the leader can form branches during propagation. As it nears the ground/surfaces, charge center from objects like towers generate their own "leaders". When the leaders collide, a connection would be established leading to a flash occurrence.

According to inventive aspects described herein, such leaders may be stabilized by fast-moving electric and magnetic fields (e.g., traveling at speeds of 95,000 m/s). Further, discharge can occur when a leader may connect to an oppositely charged streamer. Also, various conductors placed in high charge zones may further tend to cause discharge, and thus release streamers themselves. Moreover, as the plasma columns generated by the leader become stabilized even after first discharge, subsequent discharges become much more likely.

Moreover, schemes and techniques described herein (with reference to FIG. 3) provide for the capability to prevent stable streamer formation through plasma channel distortion (i.e., field destabilization). According to inventive aspects, plasma channels would collapse when the stabilizing electric and magnetic fields are disrupted. As oscillating electric fields tend to "draw out" charges in the direction of the electric field while oscillating magnetic fields tend to accelerate moving charges in a perpendicular direction, when a certain frequency of oscillation may be attained, the effects of the electric and magnetic fields attaining a "maximum" level of plasma channel distortion lead to a complete collapse of the plasma channels. In certain instances, the maximum level of plasma channel distortion can be defined as the angle whereby the plasma channel would bend away from the trajectory it would originally take in the absence of any perturbing field. For example, a complete plasma channel collapse would happen at 90 degrees or 0.5 Pi radian deflection. For aircraft applications, a collapse of field strength to the point the dielectric breakdown strength of air (at that altitude) would be sufficient. In various implementations, the collapse of field strength may be computed as: E (breakdown) E (lightning) cos (D) (where D is the distortion/deflection angle). Moreover, such a parameter would also be altitude dependent.

Figure 7:
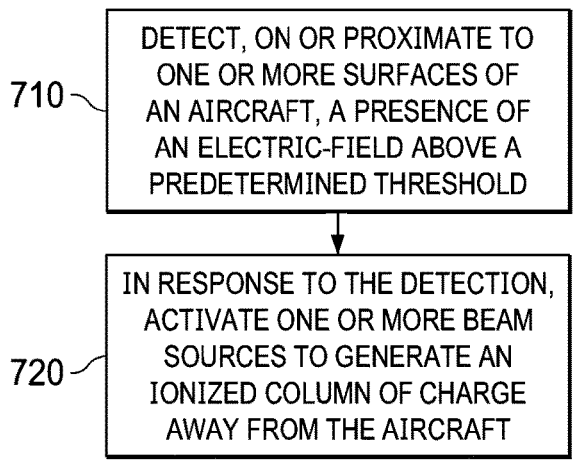
FIG. 7 is a particular illustrative aspect of methods in accordance with implementations of various techniques described herein.
Figure 9:
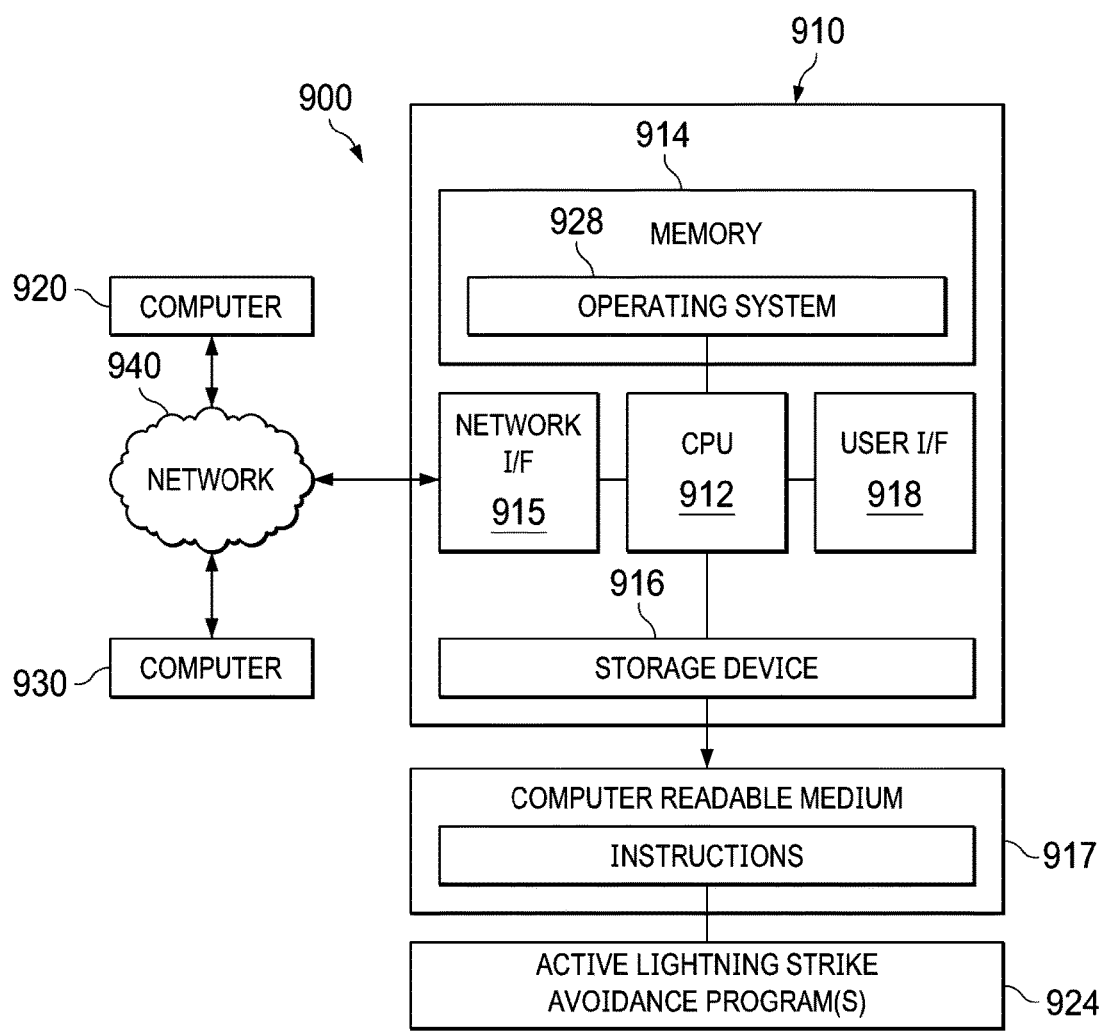
FIG. 9 is a block diagram of a computer system in accordance with implementations of various techniques described herein.

Referring to FIG. 7, a flowchart of an example operational method 700 (i.e., procedure) for the aircraft systems 100, 200 (described with reference to FIGS. 1 and 2) is shown. Advantageously, the operational method 700 can redirect stable streamer formation to avoid such formation on an aircraft. The example procedure 700 may be implemented as part of an active lightning strike avoidance program 924 (as shown in FIG. 9).

In the example operation, prior to use, one or more beam sources 150, 250 can be placed coupled to (e.g., attached to) to the aircraft surface 110, 210 within the aerial system 100, 200 such that trailing discontinuous charged particle beams 170, 270 (e.g. beams) would radiate towards the regions of the aircraft surfaces 110, 210 in respective lightning zones 112, 212 (i.e., areas of the aircraft surfaces 110, 210 that have the highest likelihood of leader attachment 180, 280) (e.g., significantly above a predetermined leader attachment threshold).

At block 710, a presence of an electric-field above a predetermined threshold may be detected on or proximate to one or more aircraft surfaces. For example, as shown in FIGS. 1 and 2, the one or more sensors 120, 220 (e.g., electroscope sensors) may detect whether "charging" has commenced (i.e., a presence of an electric-field is determined to be above a predetermined threshold) either on or near (proximate to) the one or more aircraft surfaces 110, 210. In certain implementations, the predetermined threshold would be 5% of Dielectric breakdown strength at the given altitude (and to be determined from the Paschen curve).

At block 720, in response to the detection, one or more beam sources may be activated to generate an ionized column of charge away from the aircraft. For example, as shown in FIGS. 1 and 2, the one or more beam sources 150, 250 may be activated by the first and second control systems 130, 140 to generate an ionized column of charge (e.g., a discontinuous charged particle beam 170, 270) away from the aircraft. In certain implementations, in response to the detection of the electric-field, the one or more beam sources 150, 250 may be automatically activated (autonomously activated in certain cases).

Also, according to other aspects of the operational method, in response to the activation, generating charged particle beams from the one or more beam sources. For example, with reference to FIGS. 1 and 2, in response to the activation, charged particle beams 170, 270 may be generated from the one or more beam sources 150, 250.

In one separate alternative operation, the one or more beam sources 150, 250 may be configured to "fire" random beams at regular intervals for an entire duration of an aircraft flight through a particular storm. In such an operation, no detection of an electric field would be necessary for activation of the one or more beam sources 150, 250. Hence, in one implementation, either manually (by a pilot or operator) or automatically (by computer operation), the one or more beam sources may be activated when an aircraft is in the vicinity of a storm.

Figure 8:
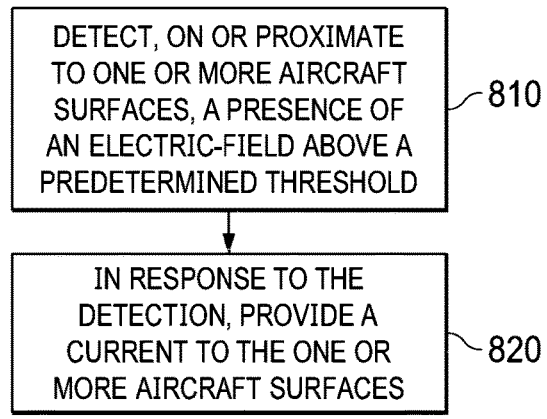
FIG. 8 is a particular illustrative aspect of methods in accordance with implementations of various techniques described herein.

Referring to FIG. 8, a flowchart of an example operational method 800 (i.e., procedure) for the aircraft system 300 (described with reference to FIG. 3) is shown. Advantageously, the operational method 800 can achieve field destabilization and prevent stable streamers from forming on an aircraft. The example procedure 800 may be implemented as part of an active lightning strike avoidance program 924 (as shown in FIG. 9).

In the example operation, prior to use, one or more metallic sub-surfaces 314 can be placed coupled to (e.g., attached to) to the one or more aircraft surfaces 310 within the aerial system 310 such that a local varying magnetic field 370 (i.e. one or more local varying magnetic field) would be generated proximate to the aircraft surface 310 in respective lightning zones 312 (i.e., areas of the one or more aircraft surfaces 310 that have the highest likelihood of leader attachment 380) (e.g., significantly above a predetermined leader attachment threshold).

At block 810, a presence of an electric-field above a predetermined threshold may be detected on or proximate to one or more aircraft surfaces. For example, as shown in FIG. 3, the one or more sensors 310 (e.g., electroscope sensors) may detect whether "charging" has commenced (i.e., a presence of an electric-field is determined to be above a predetermined threshold) either on or near (proximate to) the one or more aircraft surfaces 310. In certain implementations, the predetermined threshold would be 5% of Dielectric breakdown strength at the given altitude (and to be determined from the Paschen curve).

At block 820, in response to the detection, a current (e.g., between 300-700A) would be provided to the one or more aircraft surfaces. For example, as shown in FIG. 3, the waveform generator 340 may be activated by one or both of the first and second control systems 130, 140 to provide a current to generate a local varying magnetic field 370 in close proximity to the one or more aircraft surfaces 310. In certain implementations, in response to the detection of the electric-field, the current transmission may be automatically activated (autonomously activated in certain cases).

Also, according to other aspects of the operational method, a local varying magnetic field may be generated from the current on the one or more aircraft surfaces. For example, with reference to FIG. 3, a local varying magnetic field 370 may be generated around the one or more aircraft surfaces 310 in the lighting zone 312 that corresponds to a potential point of leader attachment 380.

Advantageously, in certain implementations, lightning strike avoidance programs 924 as implementable on a computer system 900 (e.g., a flight computer system) and as described in below paragraphs (or aerial system 300 with respect to FIG. 3), may automatically provide for the control, positioning, and operation of the one or more electroscope sensors 320, one or more metallic sub-surfaces 314, one or more aircraft surfaces 310, and the waveform generator 340.

FIG. 9 is a diagram depicting the computer system 900 (e.g., networked computer system and/or server) according to one implementation. FIG. 9 illustrates example hardware components in the computer system 900 that may be used to observe lighting and avoid streamer formation and leader attachment 180 to aircraft surfaces 110, 210, 310. In certain implementations, the computer system 900 includes a computer 910 (e.g., an aerial computer, a building management/operations computer, a flight computer system, flight controls and avionics computer system) which may be implemented as a server or a multi-use computer that is coupled via a network 940 to one or more networked (client) computers 920, 930. The methods 700, 800 may be stored as program code(s) (e.g., active lightning strike avoidance programs 924) in memory that may be performed by the computer 910, the computers 920, 930, other networked electronic devices (not shown) or a combination thereof. In some implementations, the lightning strike avoidance programs 924 may read input data (e.g., received measurements from the sensors 120, 130, 220, 230, 320 and pre-determined lighting analysis data) and provide controlled output data to various connected computer systems. In certain implementations, each of the computers 910, 920, 930 may be any type of computer, computer system, or other programmable electronic device. Further, each of the computers 910, 920, 930 may be implemented using one or more networked (e.g., wirelessly networked) computers, e.g., in a cluster or other distributed computing system. Each of the computers 910, 920, 930 may be implemented within a single computer or programmable electronic device, e.g., an aerial platform monitoring computer, aircraft flight control computer, a ground-based flight control system, a flight monitoring terminal, a laptop computer, a hand-held computer, phone, tablet, etc. In one example, the computer system 910 may be an onboard flight control computer (e.g., flight control computer that is configured to receive sensor data from the sensors 120, 130, 220, 230, 320).

In one implementation, the computer 900 includes a central processing unit (CPU) 912 having at least one hardware-based processor coupled to a memory 914. The memory 914 may represent random access memory (RAM) devices of main storage of the computer 910, supplemental levels of memory (e.g., cache memories, non-volatile or backup memories (e.g., programmable or flash memories)), read-only memories, or combinations thereof. In addition to the memory 914, the computer system 900 may include other memory located elsewhere in the computer 910, such as cache memory in the CPU 912, as well as any storage capacity used as a virtual memory (e.g., as stored on a storage device 916 or on another computer coupled to the computer 910). The memory 914 may include the active lightning strike avoidance programs 924 for aircraft surfaces 110, 210, 310. In certain examples, the computer 900 may be a standalone architecture that can run a low-level script. Alternatively, it may be integrated into a larger aircraft system that can run on any operating system corresponding to the primary computing system of the aircraft.

In FIG. 9, the storage device 916 may include lightning analysis data. In other alternative implementations, the lightning analysis data may be stored in the memory 914, in memory in the computers 920, 930, or in any other connected or networked memory storages devices. The computer 910 may further be configured to communicate information externally. To interface with a user or operator (e.g., pilot, aerodynamicist, or engineer), the computer 910 may include a user interface (I/F) 918 incorporating one or more user input devices (e.g., a keyboard, a mouse, a touchpad, and/or a microphone, among others) and a display (e.g., a monitor, a liquid crystal display (LCD) panel, light emitting diode (LED), display panel, and/or a speaker, among others). In other examples, user input may be received via another computer or terminal. Furthermore, the computer 910 may include a network interface (I/F) 915 which may be coupled to one or more networks 940 (e.g., a wireless network) to enable communication of information with other computers and electronic devices. The computer 910 may include analog and/or digital interfaces between the CPU 912 and each of the components 914, 916, 918 and 920. Further, other non-limiting hardware environments may be used within the context of example implementations.

The computer 910 may operate under the control of an operating system 926 and may execute or otherwise rely upon various computer software applications, components, programs, objects, modules, data structures, etc. (such as the program 924 and related software). The operating system 928 may be stored in the memory 914. Operating systems include, but are not limited to, UNIX® (a registered trademark of The Open Group), Linux® (a registered trademark of Linus Torvalds), Windows® (a registered trademark of Microsoft Corporation, Redmond, Wash., United States), AIX® (a registered trademark of International Business Machines (IBM) Corp., Armonk, N.Y., United States) i5/OS® (a registered trademark of IBM Corp.), and others as will occur to those of skill in the art. The operating system 926 and the program 924 in the example of FIG. 9 are shown in the memory 914, but components of the aforementioned software may also, or in addition, be stored at non-volatile memory (e.g., on storage device 916 (data storage) and/or the non-volatile memory (not shown). Moreover, various applications, components, programs, objects, modules, etc. may also execute on one or more processors in another computer coupled to the computer 910 via the network 940 (e.g., in a distributed or client-server computing environment) where the processing to implement the functions of a computer program may be allocated to multiple computers 920, 930 over the network 940.

Various aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. For example, the memory 914, the storage device 916, or both, may include tangible, non-transitory computer-readable media or storage devices.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method comprising:
   detecting, on or proximate to one or more surfaces of an aircraft, a presence of an electric field above a predetermined threshold; and
   in response to the detection, activating one or more beam sources to generate an ionized column of charge away from the aircraft.

2. The method of claim 1, wherein the one or more beam sources comprise one or more gated radioactive sources, one or more thermionic emitters, or both.

3. The method of claim 2, wherein the one or more thermionic emitters comprise an accelerating tube or a miniature cyclotron, and wherein the one or more gated radioactive sources comprise one or more alpha emitters, positron emitters, beta emitters, gamma ray sources, or neutron radiation sources.

4. The method of claim 1, further comprising:
   in response to the activation, generating charged particle beams from the one or more beam sources.

5. The method of claim 4, wherein the ion beams are discontinuous.

6. The method of claim 5, wherein the discontinuous ion beams are transmitted in pulses having time intervals between 1 ms and 100 ms for each pulse of the discontinuous ion beams.

7. The method of claim 1, wherein the beam source is configured to emit energy at a length corresponding to a mean free path greater than a path threshold, wherein the path threshold corresponds to a predetermined safe distance interval.

8. The method of claim 6, wherein the predetermined safe distance interval corresponds to a distance required to avoid a stable streamer formation on the aircraft.

9. The method of claim 1, further comprising:
   determining whether the one or more surfaces are in a lightning zone, wherein the lightening zone comprises regions of the one or more surfaces that are significantly above a predetermined leader attachment threshold.

10. A system comprising:
    one or more sensors coupled to one or more aircraft surfaces and configured to detect whether a presence of an electric field, on or proximate to the one or more aircraft surfaces, is above a predetermined threshold; and
    one or more control systems coupled to the one or more sensors, wherein the one or more control systems are configured to receive sensor data from the one or more sensors and to activate one or more beam sources to generate an ionized column of charge away from an aircraft.

11. The system of claim 10, wherein the one or more beam sources comprise either one or more thermionic emitters or one or more gated radioactive sources.

12. The system of claim 10, wherein the one or more thermionic emitters comprise an accelerating tube or a miniature cyclotron, and wherein the one or more gated radioactive sources comprise one or more of alpha emitters, positron emitters, beta emitters, gamma ray sources, or neutron radiation sources.

13. The system of claim 10, further comprising:
a power source coupled to the waveform generator, wherein the power source comprises one of a generator, an alternator, an ultracapacitor, a supercapacitor, a regenerative system, an auxiliary power unit, or a battery.

* * * * *

UNITED STATES PATENT AND TRADEMARK OFFICE
CERTIFICATE OF CORRECTION

PATENT NO. : 11,424,605 B2
APPLICATION NO. : 16/858542
DATED : August 23, 2022
INVENTOR(S) : Phalgun Madhusudan It is certified that error appears in the above-identified patent and that said Letters Patent is hereby corrected as shown below:

In the Claims

In Column 16, Claim 5, Line 27, delete "the ion beams" and insert -- the charged particle beams --, therefor.

In Column 16, Claim 6, Line 29-30, delete "the ion beams" and insert -- the charged particle beams --, therefor.

In Column 16, Claim 12, Line 62, delete "claim 10" and insert -- claim 11 --, therefor.

Signed and Sealed this
Eleventh Day of June, 2024

Katherine Kelly Vidal
*Director of the United States Patent and Trademark Office*